(12) United States Patent
Haynes et al.

(10) Patent No.: US 6,559,392 B1
(45) Date of Patent: May 6, 2003

(54) WEIGHT-SENSING SUPPORT ASSEMBLY FOR AUTOMOTIVE SEAT CUSHION FRAME

(75) Inventors: Ian D. Haynes, Windsor (CA); Mark Folkert, Farmington Hills, MI (US); Joseph M. Phares, Detroit, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/976,501

(22) Filed: Oct. 12, 2001

(51) Int. Cl.$^7$ .................. G01G 19/52; G08B 2/100
(52) U.S. Cl. .................. 177/144; 280/735; 180/273
(58) Field of Search .................. 177/136, 144, 177/210 R, 145; 280/735; 180/273; 340/667; 701/45

(56) References Cited

U.S. PATENT DOCUMENTS

| | | | |
|---|---|---|---|
| 5,296,654 A | * 3/1994 | Farley et al. | 177/145 |
| 5,481,078 A | 1/1996 | Asche | 200/85 A |
| 5,915,281 A | 6/1999 | Sparks | 73/862.581 |
| 5,942,695 A | 8/1999 | Verma et al. | 73/768 |
| 5,991,676 A | 11/1999 | Podoloff et al. | 701/45 |
| 6,039,344 A | 3/2000 | Mehney et al. | 280/735 |
| 6,040,532 A | 3/2000 | Munch | 177/144 |
| 6,069,325 A | 5/2000 | Aoki | 177/136 |
| 6,089,106 A | 7/2000 | Patel et al. | 73/862.582 |
| 6,092,838 A | 7/2000 | Walker | 280/735 |
| 6,104,100 A | 8/2000 | Neuman | 307/10.1 |
| 6,161,891 A | 12/2000 | Blakesley | 296/65.01 |
| 6,201,480 B1 | 3/2001 | Aoki | 340/667 |
| 6,218,632 B1 | 4/2001 | McCarthy et al. | 177/144 |
| 6,231,076 B1 | 5/2001 | Blakesley et al. | 280/735 |
| 6,242,701 B1 | 6/2001 | Breed et al. | 177/144 |
| 6,323,444 B1 | * 11/2001 | Aoki | 177/144 |
| 6,356,200 B1 | * 3/2002 | Hamada et al. | 340/667 |
| 6,401,855 B1 | * 6/2002 | Wolfe | 280/735 |
| 6,448,512 B1 | * 9/2002 | Cooper | 177/144 |

* cited by examiner

Primary Examiner—Randy W. Gibson
(74) Attorney, Agent, or Firm—Bill C. Panagos

(57) ABSTRACT

A weight-sensing assembly for supporting an automotive seat cushion frame atop a track assembly includes a pair of coupling members that are secured to the seat cushion frame. A set of mounting locations on each coupling member, preferably separated by an elongate portion of the coupling member of generally uniform cross-section, are secured to a respective end of a strain gage sensor's elongate sensing beam. The other end of each sensing beam is secured to a respective mounting location defined on the upper rails of a seat track assembly. The elongate portion of the coupling member, and respective portions of the upper rails separating the mounting locations thereon, are characterized by a flexural stiffness, in a bending plane that includes a longitudinal axis of the sensing beam of at least one sensor assembly, that is at least three times greater than the flexural stiffness of each sensor's sensing beam.

14 Claims, 3 Drawing Sheets

WEIGHT-SENSING SUPPORT ASSEMBLY FOR AUTOMOTIVE SEAT CUSHION FRAME

BACKGROUND OF THE INVENTION

1. Field of the Invention

The invention relates to apparatus for generating information regarding the presence and size of an occupant seated within a motor vehicle.

2. Background Art

It is increasingly desirable to tailor the response of a vehicle passenger safety restraint to a detected presence and size of a vehicle occupant. One known expedient is to obtain a measure representative of a weight placed upon the seating surface of an occupant's seat. Because the prior art has sought to provide a weight-sensing capability with little or no alteration of the seat's supporting structure, the prior art teaches providing a measure representative of both the presence and the weight of an object placed on a vehicle seat using a plurality of strain gage sensors bonded to a structural support for the seat.

Under a first known approach, the strain gage sensors are attached to the risers with which the seat's supporting platform, such as a track assembly permitting relative longitudinal movement of the seat within the vehicle, is secured to the vehicle floor. This approach advantageously requires only minimal alteration to the design of the track assembly risers. Unfortunately, because a relative movement of the track assembly's upper and lower rails will effect a change in the loads exerted on the individual risers in response to a given weight placed on the seat, this approach requires the detection of the relative longitudinal position of the upper rail relative to the lower rail, and relatively complex algorithms with which to obtain an estimate of occupant weight based upon strain gage and position sensor outputs. The estimation of occupant weight is further complicated by the overhanging loads that are likely to be placed on one or more of the risers, due to typical seat and track assembly geometries.

Under another known approach, U.S. Pat. No. 6,039,344 teaches a vehicle occupant weight sensor apparatus wherein the seat pan of a vehicle seat frame is coupled to an upper rail of a seat track assembly by a plurality of elongate sensing beams, with each sensing beam including a plurality of strain gages connected to an appropriate Wheatstone bridge. Typically, such prior art occupant weight sensing systems rely upon joint rotation at the joints formed at each end of the beam in order to generate the desired response from the system's strain gages. Indeed, U.S. Pat. No. 6,231,076 teaches the use of a sensor assembly that employs a bent metal substrate designed to maximize sensing element flexure through joint rotation. Unfortunately, complex algorithms are similarly required to obtain an estimate of occupant weight from the resulting stain gage output because the algorithm must account for the moments exerted on the stain gage substrate at the joints due to the resilient flexing of the seat's structural supports. Such apparatus are still likely to incur a loss of desired weight-sensing resolution as a result of such joint rotation.

SUMMARY OF THE INVENTION

It is an object of the invention to provide a weight-sensing assembly for supporting a seat cushion frame, as may form the structural foundation for a seat of a motor vehicle, that avoids the computational complexities resulting from rotation at the joints formed between the seat's structural supports and a weight-sensing element of the assembly.

It is also an object of the invention to provide a weight-sensing assembly for supporting a seat cushion frame of a motor vehicle atop a floor-mounted track assembly that features an improved weight-sensing resolution over known assemblies.

A further object of the invention is to provide a weight-sensing assembly for supporting a seat cushion frame within a motor vehicle that requires minimal alteration to the design of either the frame or the platform upon which the frame is to be mounted.

Under the invention, a weight-sensing assembly is provided for supporting a seat cushion frame having a plurality of spaced mounting locations above a platform that likewise includes a plurality of spaced mounting locations in general opposition to the mounting locations of the frame. The assembly includes one or, preferably, two elongate coupling members, each of which includes a first and second set of spaced mounting locations, for example, proximate to each longitudinal end thereof, such that the first set of mounting locations of a given coupling member is generally aligned with and secured to the mounting locations of a first one of the frame and the platform. The second set of mounting locations of each given coupling member is generally laterally offset from the mounting locations of a second one of the frame and the platform.

Thus, in an exemplary weight-sensing assembly constructed in accordance with the invention, each coupling member is secured at its respective first set of mounting locations to the aligned mounting locations defined on the seat cushion frame. In this exemplary embodiment, the coupling members' second set of mounting locations are laterally offset from the mounting locations defined on an upper surface of a track assembly that otherwise accommodates generally longitudinal translation of the seat cushion frame within the motor vehicle in a known manner. Preferably, where the exemplary weight-sensing assembly employs a pair of coupling members, the coupling members extend in a direction generally parallel to the upper tracks of the track assembly.

The assembly further includes a pair of sensors secured to each coupling member. Each sensor includes an elongate sensing beam having a longitudinal axis extending between a first end and a second end, and at least one strain gage mounted on the sensing beam for generating an output signal representative of an elastic deformation of the sensing beam in a bending plane that includes the longitudinal axis of the sensor. Preferably, the at least one strain gage is mounted proximate to the longitudinal midpoint of the sensing beam, and the sensing beam of each sensor is preferably of generally uniform cross-section. The strain gages are connected in electrical communication with an electrical bridge circuit, with which to generating a signal representative of a weight placed on the seat cushion frame.

The first end of the sensing of each sensor is secured to a respective mounting location of the second set of a given coupling member's mounting locations to form a first joint proximate to each longitudinal end of the given coupling member. The second end of the sensing beam of each sensor is secured to a respective one of the mounting locations of the second one of the frame and the platform to form a second joint. Thus, in the exemplary embodiment wherein the first set of mounting locations on each coupling member is secured to the seat cushion frame, the second end of each sensing beam is secured to a respective mounting location defined on the upper surface of the track assembly.

Under the invention, the sensing beam of each sensor, the coupling member, and the second one of the frame and the platform each have a respective flexural stiffness resisting bending in a bending plane that includes the longitudinal axis of the sensing beam of at least one of the sensors. The respective flexural stiffness of the coupling member and of the second one of the frame and the platform is at least about three times greater than the flexural stiffness of the sensing beam of each sensor. As a result, a displacement of the coupling member relative to the second one of the frame and the platform in response to a weight placed on the frame is characterized by a negligible joint rotation, such that . Most preferably, the respective flexural stiffness of the coupling member and of the second one of the frame and the platform is at least about five time greater than the flexural stiffness of each sensor's sensing beam.

In accordance with another feature of the invention, in order to further improve the assembly's resolution, i.e., its ability to detect small changes in weight placed atop the seat cushion frame, each coupling member includes an elongate portion of generally uniform cross-section separating at least the second set of mounting locations. Most preferably, the elongate portion of the coupling member has a neutral surface in response to bending in the bending plane that is generally coplanar with the neutral axis in bending of the sensing beams of the attached sensors. The elongate portion of each coupling member further preferably includes a plane of symmetry in response to bending in the bending plane, with the sensing beam of at least one sensor having as a plane of symmetry in response to bending in the bending plane that is generally coplanar with the plane of symmetry of its respective coupling member.

From the foregoing, it will be appreciated that the invention, by avoiding joint rotation and driving the weight-induced stresses in the sensing beams of the sensors to each beam's center, advantageously provides a weight-sensing assembly for supporting a seat cushion frame atop a supporting platform, such as a seat track assembly of a motor vehicle, whose strain gage output provides increased resolution while being less susceptible to change in response to a change in the longitudinal position of the seat cushion frame relative to the platform's supporting risers. And, because the invention's weight-sensing assembly includes the strain gage sensors, the weight invention can beneficially be integrated into existing vehicle seating designs with minimal alteration to either the seat cushion frame or the supporting platform.

Other advantages, features, and benefits of the invention will be readily apparent from the following detailed description of a preferred embodiment, when taken in connection with the accompanying Drawings.

DETAILED DESCRIPTION OF THE PREFERRED EMBODIMENT

Figure 1:
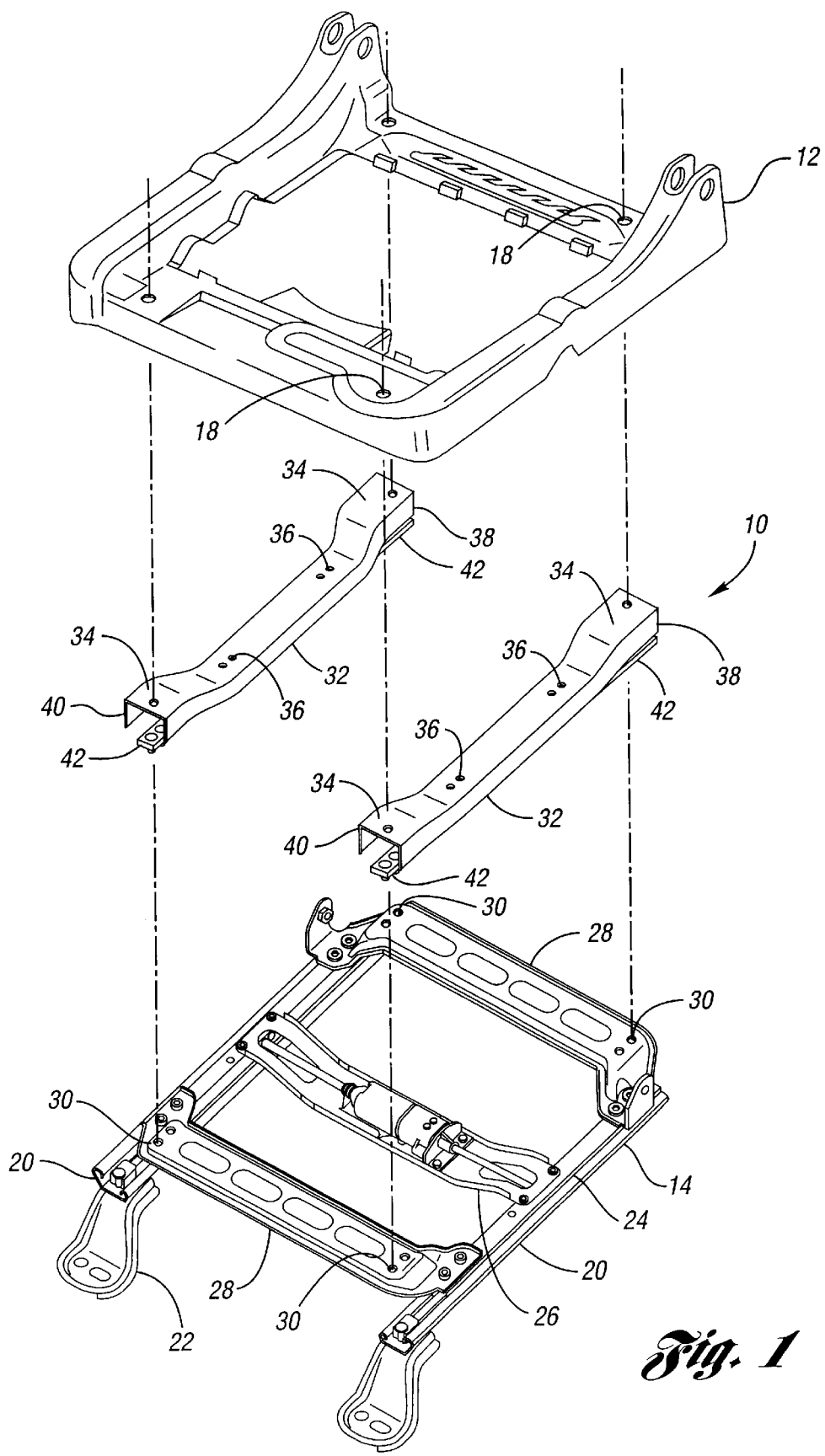
FIG. 1 is an exploded view in perspective of the lower portion of a vehicle seat cushion frame supported atop a track assembly by a weight-sensing assembly in accordance with the invention.
Figure 2:
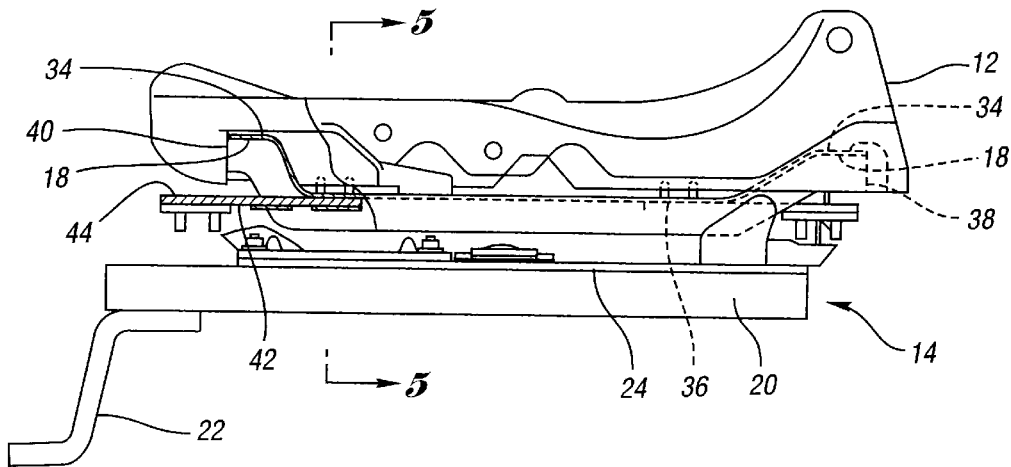
FIG. 2 is a side elevational view, partially broken away, of the seat cushion frame, weight-sensing assembly, and track assembly of FIG. 1.
Figure 3:
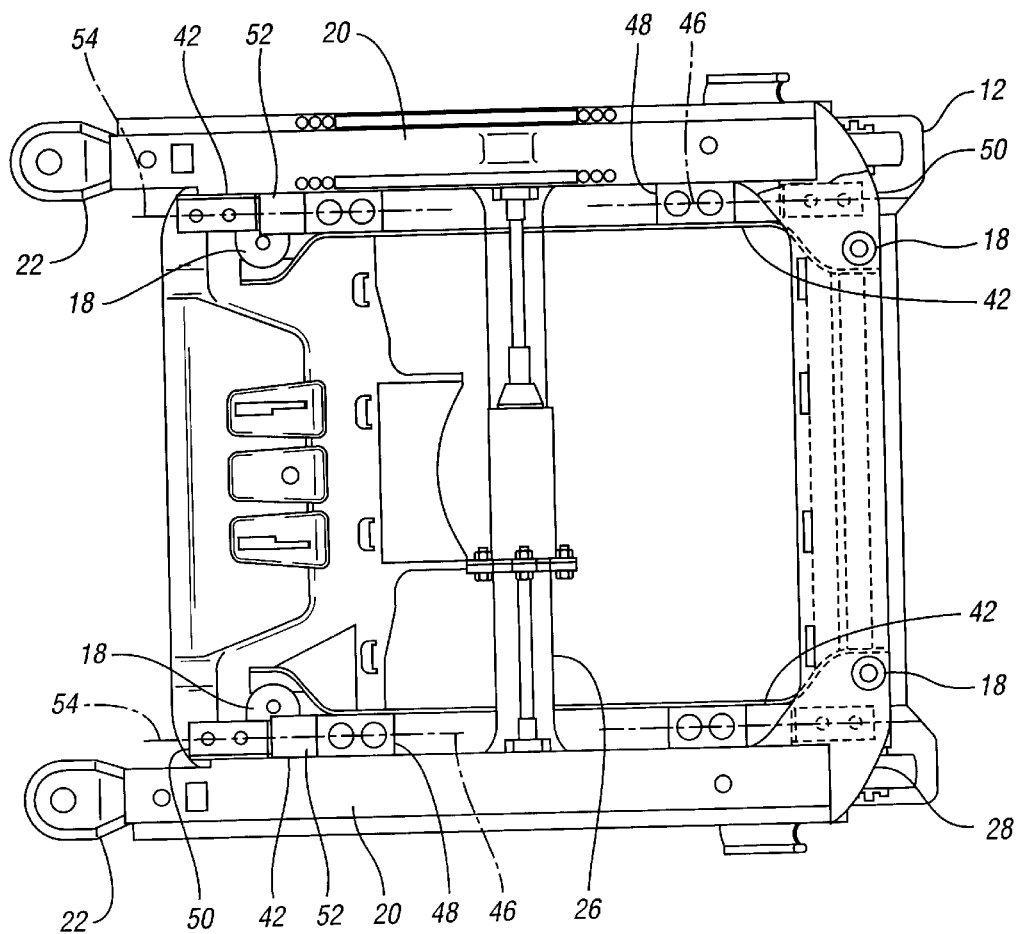
FIG. 3 is a bottom plan view of the seat cushion frame, weight-sensing assembly, and track assembly of FIG. 1, with the lateral cross-members of the track assembly broken away for clarity of illustration.
Figure 4:
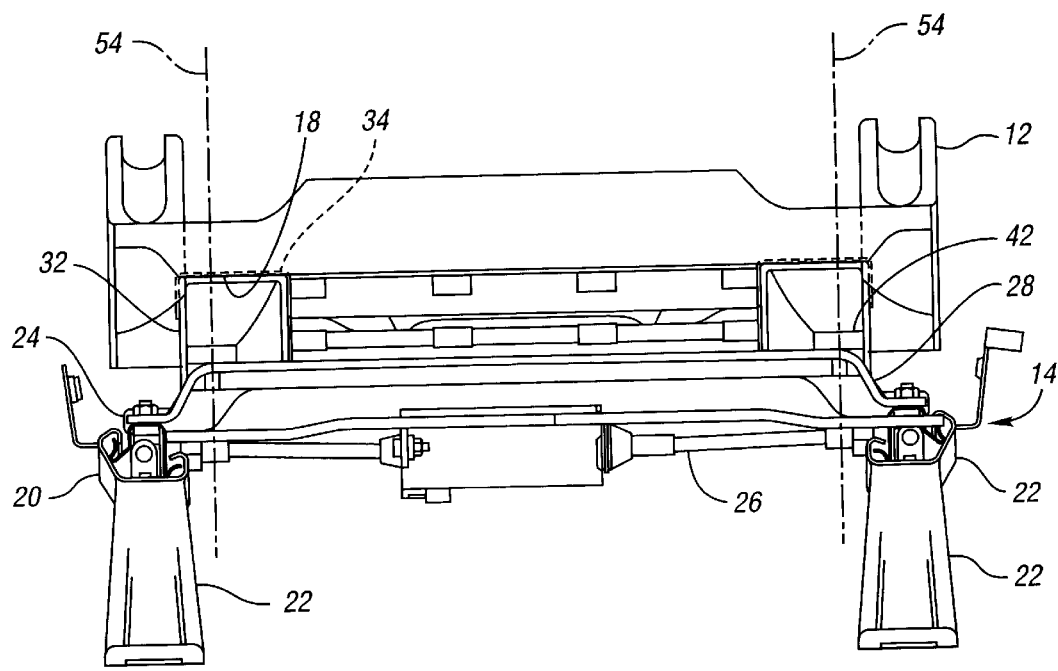
FIG. 4 is a front elevational view, partially broken away, of the seat cushion frame, weight-sensing assembly, and track assembly of FIG. 1.

An exemplary weight-sensing assembly 10 for supporting a vehicle seat cushion frame 12 atop a track assembly 14 is illustrated in FIGS. 1–5. Specifically, the seat cushion frame 12 includes a lower seat cushion (not shown) secured above a seat pan (not shown) that is conveniently formed of a stamped sheet steel. While the seat pan may include a plurality of integral ridges and other cross-sectional variations in order to improve the overall rigidity of the seat pan, the invention contemplates that the seat pan is likely to resiliently flex slightly in response to application of a sizable weight on top of the seat cushion frame 12, as when a particularly heavy vehicle occupant (not shown) is seated within the vehicle. As best seen in FIGS. 2 and 3, a lower portion of the seat cushion frame 12 defines a plurality of spaced mounting locations 18.

Returning to FIG. 1, the track assembly 14 includes a pair of lower rails 20 that are supported above the vehicle floor (not shown) by a plurality of risers 22 (only the forward risers 22 being illustrated in the Drawings for clarity). The track assembly 14 also includes a pair of upper rails 24 that are mounted on the lower rails 20 for relative longitudinal movement under the control of a seat-positioning drive assembly 26. The track assembly 14 further includes a pair of lateral cross-members 28 that prevent upper rail toe-in upon the loading of the track assembly 14 with a seated vehicle occupant. The lateral cross-members 28 further serve to define, on the track assembly 14, a plurality of spaced mounting locations 30 that are in general opposition to the mounting locations 18 of the seat cushion frame 12.

As seen in FIGS. 1 and 2, the exemplary assembly 10 includes a pair of elongate coupling members 32. Each coupling member 32 includes a first and second set of spaced mounting locations 34,36 proximate to each of the coupling member's longitudinal ends 38,40. The first set of mounting locations 34 of a given coupling member is generally aligned with and secured to the mounting locations 18 defined on the lower portion of the seat cushion frame 12. The second set of mounting locations 36 of each given coupling member 32 is generally laterally offset from the mounting locations 30 defined on the track assembly 14.

As best seen in FIG. 3, the exemplary assembly 10 further includes a plurality of strain gage sensors 42. Each sensor 42 includes a generally elongate sensing beam 44 having a longitudinal axis 46 extending between a first end 48 and a second end 50. While the invention contemplates use of sensing beams of any suitable configuration including, for example, sensing beams 44 having integral longitudinal bends to accommodate the profile of a seat's existing structural supports, in the exemplary embodiment 10, the sensing beam of each sensor is of generally-uniform, rectangular cross-section. Similarly, while the sensing beam 44 is formed of any suitable material, in the exemplary embodiment, the sensing beam 44 is formed of a SAE 430 stainless steel.

The first end 48 of the sensing beam 44 of each sensor 42 is secured to a given coupling member 32 at one of the coupling member's second set of mounting locations 36, thereby forming a first joint proximate to the first longitudinal end 48 of each sensor. The second end 50 of the sensing beam 44 of each sensor 42 is secured to a respective one of the mounting locations 30 of the track assembly 14 to thereby form a second joint proximate to the second longitudinal end 50 of each sensor 42. In this manner, the sensing beams 44 of the sensors mechanically couple each coupling member 32 to the track assembly 14.

Also as seen in FIG. 3, each sensor 42 includes a thick-film strain gage 52 mounted on the sensing beam 44 for generating an output signal representative of an elastic deformation of the sensing beam 44 in a bending plane 54 that includes the longitudinal axis 46 of the sensor 42. Preferably, the strain gage 52 is mounted proximate to the longitudinal midpoint of the portion of the sensing beam 44 between the first and second joints. The strain gages 52 of the several sensors 42 are placed in electrical communication with an electrical bridge circuit (not shown), with which to generating a signal representative of a weight placed on the seat cushion frame 12.

In accordance with the invention, the sensing beam 44 of each sensor 42, the coupling member 32, and the track assembly 14 each have a respective flexural stiffness resisting bending in the bending plane 54 of at least one and, preferably, both of the sensors 42 secured to a given coupling member 32, such that the respective flexural stiffness of the coupling member 32 and of the track assembly 14 is at least about three times greater and, preferably, at least about five times greater than the flexural stiffness of the sensing beam 44. As a result, a displacement of the coupling member 32 relative to the track assembly 14 in response to a weight placed on the seat cushion frame 12 is characterized by a negligible joint rotation at the first and second joints, thereby improving resolution of the resulting strain gage sensor output.

Figure 5:
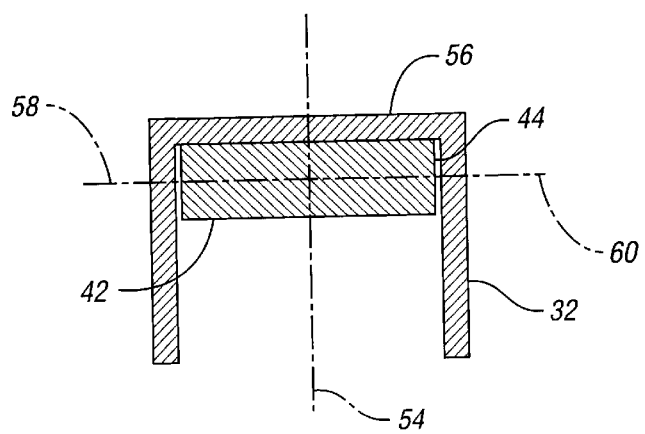
FIG. 5 is an enlarged cross-sectional view of the weight-sensing assembly proximate to one of its longitudinal ends, taken along line 5—5 of FIG. 2.

The invention contemplates any suitable choice of material and/or cross-sectional configuration for the coupling members 32 and the track assembly 14 by which to achieve the minimum relative flexural stiffness. By way of example only, in the exemplary assembly 10, each coupling member 32 is conveniently stamped from sheet steel to include a central, elongate portion 56 of generally uniform, U-shaped cross-section separating the second set of mounting locations 36. The U-shaped cross-section of the central, elongate portion 56 of one of the coupling members 32 is illustrated in FIG. 5.

In accordance with another feature of the invention, in order to further improve the resolution of the exemplary assembly 10, that is, the ability to of the assembly 10 to detect small changes in weight placed atop the seat cushion frame 12, the elongate portion 56 of each coupling member 32 ha s a neutral surface 58 in response to bending in the bending plane 54 that is proximate to and, most preferably, generally coplanar with the neutral surface 60 in bending of the sensing beams 44 of the attached sensors 42. In this manner, the exemplary assembly 10 provides a smooth load flow from each coupling member 32 to the sensing beams 44 of its attached sensors 42, thereby further improving assembly resolution.

In accordance with yet another feature of the invention, the elongate portion 56 of each coupling m ember 32 also includes a plane of symmetry in response to bending in the bending plane 56 that is generally coplanar with a plane of symmetry in response to bending in the bending plane 56 of the sensing beam 44 of at least one sensor 42. By aligning the respective planes of symmetry of the coupling member's central, elongate portion 56, the exemplary assembly 10 advantageously avoids driving off-axis bending moments into the sensing beams 44 of the sensors 42, thereby further improving resolution of the strain gage outputs.

While an exemplary embodiment of the invention has been illustrated and described, it is not intended that the exemplary embodiment illustrate and describe all possible forms of the invention. Rather , the words used in the specification are words of description rather than limitation, and it is understood that various changes may be made without departing from the spirit and scope of the invention. For example, while the coupling members 32 of the exemplary assembly 10 extend generally in a direction parallel to the upper rails 24 of the track assembly 14, the invention contemplates securing the coupling members 32 to the seat cushion frame 12 and the track assembly 12, respectively, such that the elongate portion 56 of each coupling member 32 extends in a direction generally perpendicular to each of the track assembly's upper rails 24.

Similarly, while the sensing beams 44 of the sensors 42 of the exemplary assembly 10 mechanically couple each coupling member 32 to the mounting locations 30 of the track assembly 14 while the coupling member is otherwise directly secured to the seat cushion frame 12, the invention alternatively contemplates securing the coupling member 32 directly to the track assembly 14 while mechanically coupling the coupling member 32 to the seat cushion frame 12 with the sensing beams 44 of the sensors 42. In this event, it is, of course, necessary to provide the seat cushion frame 12 with sufficient flexural stiffness in the bending plane 54 to substantially avoid joint rotation when a weight is placed upon the seat cushion frame 12.

What is claimed is:

1. A weight-sensing assembly for supporting a seat cushion frame above a platform, wherein the frame includes a plurality of spaced mounting locations, and wherein the platform includes a plurality of spaced mounting locations in general opposition to the mounting locations of the frame, the assembly comprising:

a coupling member including a first and second set of spaced mounting locations, wherein the first set is generally aligned with and secured to the mounting locations of a first one of the frame and the platform, and the second set is generally laterally offset from the mounting locations of a second one of the frame and the platform; and a pair of sensors, each sensor including an elongate sensing beam having a longitudinal axis extending between a first end and a second end, and at least one strain gage mounted on the sensing beam for generating an output signal representative of an elastic deformation of the sensing beam in a bending plane that includes the longitudinal axis of the sensor, wherein the first end of the sensing beam of each sensor is secured to a respective mounting location of the second set to form a first joint, and the second end of the sensing beam of each sensor is secured to a respective one of the mounting locations of the second one of the frame and the platform to form a second joint, wherein the sensing beam of each sensor, the coupling member, and the second one of the frame and the platform each have a respective flexural stiffness resisting bending in a bending plane that includes the longitudinal axis of the sensing beam of at least one of the sensors, the respective flexural stiffness of the coupling member and of the second one of the frame and the platform being at least about five times greater than the flexural stiffness of the sensing beam of each sensor, whereby a displacement of the coupling member relative to the second one of the frame and the platform in response to a weight placed on the frame is characterized by a negligible joint rotation.

2. The assembly of claim 1, wherein the platform includes a track assembly including an elongate upper rail supported for relative longitudinal movement on a stationary lower rail, and wherein the coupling member is generally parallel to the upper rail.

3. The assembly of claim 1, wherein the at least one strain gage of each sensor is mounted on the sensing beam proximate to a midpoint between the first end and the second end.

4. The assembly of claim 1, wherein the sensing beam of each sensor is of generally uniform cross-section.

5. The assembly of claim 1, wherein the coupling member includes an elongate portion of generally uniform cross-section separating the second set of mounting locations, the elongate portion having a first neutral surface in response to bending in the bending plane; and wherein the sensing beam of each sensor has a second neutral surface in response to bending in the bending plane that is generally coplanar with the first neutral surface.

6. The assembly of claim 5, wherein the elongate portion has a first plane of symmetry in response to bending in the bending plane, and wherein the sensing beam of at least one sensor has a second plane of symmetry in response to bending in the bending plane that is generally coplanar with the first plane of symmetry.

7. The assembly of claim 1, wherein the respective flexural stiffness of the coupling member and of the second one of the frame and the platform is at least about five times greater than the flexural stiffness of the sensing beam of each sensor.

8. A support assembly for an automotive seat cushion frame, the assembly comprising:

a track assembly including a pair of elongate, parallel-spaced rails disposed beneath the frame, the track assembly defining an array of mounting locations;

a pair of elongate coupling members secured to the frame, each coupling member including a pair of longitudinally-spaced mounting locations that are generally-horizontally offset from the array of mounting locations when the coupling members are secured to the frame; and a plurality of sensors mechanically coupling the mounting locations of the coupling members with the mounting locations of the track assembly, wherein each sensor includes an elongate sensing beam having a longitudinal axis extending between the respective mounting locations of the coupling member and the mounting location of the track assembly, and at least one strain gage mounted on the sensing beam for generating an output signal representative of a pure bending of the sensing beam in a bending plane that includes the longitudinal axis of the sensor in response to placement of a weight on the frame, wherein the sensing beam of each sensor, the coupling member, and the track assembly have a respective flexural stiffness resisting bending in the bending plane, the respective flexural stiffness of the coupling member and of the track assembly being at least about three times greater than the flexural stiffness of the sensing beam of each sensor, whereby a displacement of the coupling member relative to the second one of the frame and the platform in response to the weight is characterized by negligible rotation at a first joint formed between the sensor and the coupling member, and at a second joint formed between the sensor and the track assembly.

9. The assembly of claim 8, wherein the track assembly including an elongate upper rail supported for relative longitudinal movement on a stationary lower rail, and wherein each coupling member is generally parallel to a respective one of the rails of the track assembly.

10. The assembly of claim 8, wherein the at least one strain gage of each sensor is mounted on the sensing beam proximate to a midpoint between the first and second joints.

11. The assembly of claim 8, wherein the sensing beam of each sensor is of generally uniform cross-section at least along a portion extending between the first and second joints.

12. The assembly of claim 8, wherein the mounting locations of the coupling member are bridged by an elongate portion of generally uniform cross-section, the elongate portion having a first neutral surface in response to bending in the bending plane; and wherein the sensing beam of each sensor has a second neutral surface in response to bending in the bending plane that is generally coplanar with the first neutral surface.

13. The assembly of claim 12, wherein the elongate portion has a first plane of symmetry in response to bending in the bending plane, and wherein the sensing beam of at least one sensor has a second plane of symmetry in response to bending in the bending plane that is generally coplanar with the first plane of symmetry.

14. The assembly of claim 8, wherein the respective flexural stiffness of the coupling member and of the track assembly is at least about five times greater than the flexural stiffness of the sensing beam of each sensor.

* * * * *